Aug. 12, 1941.    L. A. KOCH, JR    2,252,228
AUTOMOBILE EXHAUST PIPE EXTENSION
Filed Sept. 12, 1938
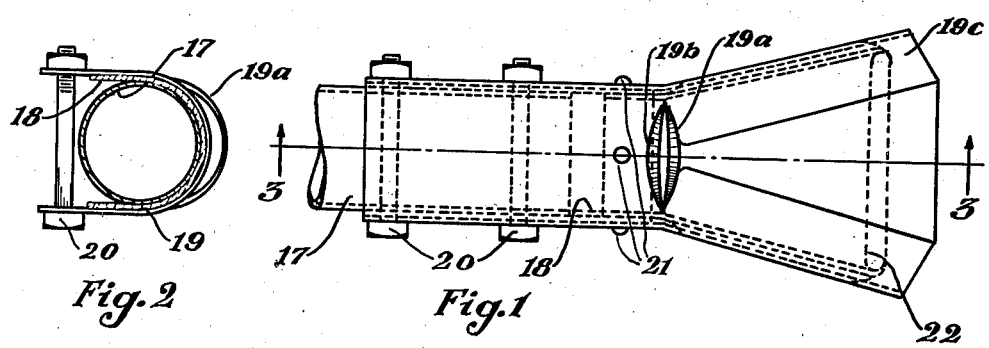
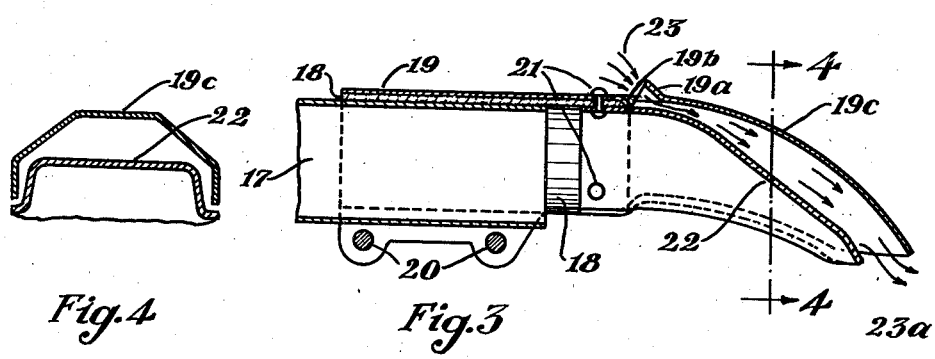
INVENTOR
Louis A Koch Jr.
BY
John L. Milton
ATTORNEY Patented Aug. 12, 1941

2,252,228

UNITED STATES PATENT OFFICE 2,252,228

AUTOMOBILE EXHAUST PIPE EXTENSION

Louis A. Koch, Jr., near Louisville, Ky.

Application September 12, 1938, Serial No. 229,554

1 Claim. (Cl. 138—25)

This invention relates to improvements in exhaust deflectors for use on exhaust pipes of gasoline engines and similar appliances, and has particular utility when used on an exhaust pipe of an automobile engine.

The principal object of this invention is to provide an exhaust deflector having an auxiliary internal baffle for directing and controlling the flow of high temperature exhaust gases.

Another object of this invention is to provide an exhaust deflector having a solid material of low heat conductivity placed between the connecting portion of the exhaust deflector and the exhaust pipe for protecting the exterior finish of the exhaust deflector from the influence of the high temperatures of the exhaust pipe and exhaust gases.

A further object of this invention is to provide an exhaust deflector having an auxiliary internal baffle that is spaced inwardly from the members providing the external appearance for the deflector, so as to protect such members from the high temperatures and other deteriorating effects of the exhaust gases, thus preserving the finish of the members providing the desired external appearance.

A still further object of this invention is to provide an exhaust deflector, of the aforesaid type, in which the baffle is supported in spaced relation inwardly with respect to the members providing the desired external appearance for providing an air chamber through which air moves so as to maintain the external members at a temperature appreciably lower than the exhaust pipe, or hot exhaust gases.

In the accompanying drawing:

Figure 1 is a plan view of the assembled exhaust gas deflector;

Figure 2 is a partial end view showing the solid material 18 of low heat conductivity overlying the inner surface of the mounting portion of the outer wall structure 19;

Figure 3 is a partial sectional view taken along lines 3—3 of Figure 1 showing the solid material of low heat conductivity, and the air chamber between the outer member 19c and baffle 22, and Figure 4 is a partial sectional view taken along lines 4—4 of Figure 3 showing the construction and relation of the outer member 19c and baffle 22.

In the drawing, the position of an exhaust pipe on an automobile is not illustrated. However, it is well known that the exhaust pipe comprises a sheet iron or steel pipe located beneath the body of the automobile, which pipe projects rearwardly from the rear end of the automobile, beneath and frequently behind the rear bumper.

It is also well known that exhaust pipes on automobiles are subjected to intense heat, while the gasoline engine is operating, and to rapid cooling, when the engine is stopped. Such iron exhaust pipes are further subjected to the severe corrosive action of the products of combustion and water, and, accordingly, soon become rusty and unsightly. Therefore, considerable effort has been made to overcome the unsightly appearance of the exhaust pipe, and to provide a structure in keeping with the present artistic appearance of the remaining parts of the automobile.

In order to improve the appearance of the exhaust pipe, and to further direct the flow of exhaust gases out of contact with the automobile body and rear bumper, extensions or ornamental coverings are secured directly to the exhaust pipe. These extensions are ornamented and finished with fine plating to provide the desired artistic appearance, and, in many instances, are shaped to direct the discharged gases from the exhaust pipe, so that the hot exhaust gases cannot mar the fine finish of the automobile bodies, rear bumpers, etc.

Experience has shown that the latter mentioned devices do not provide a permanent neat appearance for the exhaust pipe. Obviously, since they are clamped directly to the exhaust pipe, they are accordingly subjected to the same intense heating and cooling that impairs the finish of the exhaust pipe. Thus, discoloration from the intense heat of the exhaust gases develops very early. Likewise, further destruction of the ornamental appearance of the extension is produced by the chemical action of the exhaust gases drawn into contact with the external surfaces of the extension.

Thus, as adverted to at the outset of this description, the principal object of this invention is to provide an exhaust deflector that will not only properly control the flow of the discharged exhaust gases, but one that will effectively cover the unsightly exhaust pipe and maintain a permanent neat appearance.

As shown in Figures 1 through 4, the exhaust deflector comprises an external decorative terminus 19c, which terminus has a tubular sleeve portion 19 that extends substantially around the exhaust pipe 17 and is secured thereto by clamping bolts 20.

Referring to Figures 2 and 3 it will be observed that a solid material 18 of low heat conductivity is clamped between the tubular sleeve portion 19 and the exhaust pipe 17 for insulating the sleeve portion from the high heat of the exhaust pipe. As will be hereinafter described in detail, the insulating material 18 is secured to the exhaust deflector and carried therewith as a unit when same is not secured to an exhaust pipe, thus facilitating assembly of the deflector and insulating material on an exhaust pipe.

In Figures 1 and 3 it will be observed that the terminus 19c merges from the sleeve portion 19 and slopes downwardly and rearwardly thereof, and has a horizontal flaring, thus forming an enlarged terminus.

Within the enlarged terminus, an auxiliary exhaust gas baffle is located, which baffle is likewise enlarged and sloped downwardly and rearwardly of the exhaust pipe. The purpose of the baffle is to control and direct the discharged exhaust gases so that they will not contact the external surfaces of the terminus 19c, or parts of the automobile. It will therefore be understood that the formation of the terminus 19c and sleeve portion 19 provides the desired artistic external appearance for the deflector.

In Figures 1 and 3 it will be further noted that one end of the baffle 22 is secured to the sleeve portion 19 by rivets or spot welding 21, and that the secured end of the baffle likewise clamps the insulating material 18 to the sleeve portion of the exhaust deflector. In this respect it will be apparent that the rivets 19 provide only a minimum of metallic contact of the baffle with the sleeve portion 19, so that the heat of the baffle is radiated before effectively raising the temperature of the sleeve portion 19 or terminus 19c. Obviously, securing the insulating material 18 between the sleeve portion 19 and baffle 22 likewise serves to insulate the external members of the ornamental deflector from the heat of the exhaust gases and exhaust pipe.

Particular reference to Figures 1, 3 and 4 will reveal that the baffle 22 is spaced inwardly from the terminus 19c, thereby providing an air chamber for effectively insulating the terminus from the heat of the baffle. It will also be observed that a louvre 19a is provided in the outer portion of the baffle where the terminus 19c merges into the sleeve portion 19, and that the forward edge 19b of the louvre is bent downwardly.

Accordingly, it will be obvious that the louvre 19a collects and conducts cool external air into the air chamber formed between the terminus 19c and baffle 22. In Figure 3, arrows 23 illustrate the path of the collected cool air, which cool air is forced into the intake louvre 19a by the forward motion of the automobile.

Referring now to Figure 3, it will be apparent that the relation illustrated between the discharge ends of the baffle 22 and terminus 19c provides a very effective structure for siphoning air through the air chamber when the automobile is motionless, but the engine running; such siphoning being effected by the passage of the exhaust gases over the discharge end of the baffle 22. Thus, regardless of whether the car is in motion or at rest, an appreciable amount of cool air is circulated in the air chamber for maintaining the external terminus 19c at a temperature considerably less than the temperature of the baffle 22.

In the foregoing illustrations a very efficient and economical manner of protecting and maintaining the desired ornamental appearance of an exhaust deflector through the use of a solid material of low heat conductivity and an internal baffle have been shown, and it is submitted that many other ways of practicing this invention will be obvious without departing from the spirit and scope of the appended claim.

Having thus described the invention, I claim:

An exhaust-pipe extension comprising, an outer wall structure having a mounting portion adapted to receive and grip an exhaust pipe, and a terminus portion adapted to extend beyond the end of an exhaust pipe; a solid material of low heat conductivity overlying the inner surface of the mounting portion of the said outer wall structure, for thermally insulating the said mounting portion from the exhaust pipe; an inner wall structure spreading beneath the under surface of the terminus portion of the said outer wall structure, for shielding the said terminus portion from gases discharged from the exhaust pipe, the said inner wall structure having a portion thereof overlying a portion of the solid material of low heat conductivity; means fixedly supporting the said inner wall structure in spaced relation to the said outer wall structure for providing an air space between the said structures through which air moves for maintaining a heat insulation therebetween and for cooling the said structures; and means for securing the mounting portion of the said outer wall structure to the end of the exhaust pipe.

LOUIS A. KOCH, Jr.